(12) United States Patent
Heim (10) Patent No.: US 12,447,788 B1
(45) Date of Patent: Oct. 21, 2025

(54) LEG TUBE ASSEMBLY AND METHOD OF MANUFACTURING LEG TUBE ASSEMBLY

(71) Applicant: Caterpillar Paving Products Inc., Brooklyn Park, MN (US)

(72) Inventor: Daniel Jonathan Heim, Blaine, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 19/062,092

(22) Filed: Feb. 25, 2025

(51) Int. Cl.
*B60G 17/00* (2006.01)

(52) U.S. Cl.
CPC .......... *B60G 17/00* (2013.01); *B60G 2300/09* (2013.01); *B60G 2500/30* (2013.01)

(58) Field of Classification Search
CPC B60G 17/00; B60G 2300/09; B60G 2500/30; B62D 11/20; B62D 55/084; E01C 19/48; E01C 19/506; E01C 2301/00
See application file for complete search history.

(56) References Cited

U.S. PATENT DOCUMENTS

| | | | |
|---|---|---|---|
| 4,029,165 A * | 6/1977 | Miller | E02F 9/10 |
| | | | 404/84.2 |
| 5,127,335 A * | 7/1992 | Whitaker, Jr. | E01B 29/02 |
| | | | 104/3 |
| 7,523,995 B2 * | 4/2009 | Rio | E01C 23/088 |
| | | | 180/209 |
| 7,721,831 B2 | 5/2010 | Smolders et al. | |
| 9,315,955 B2 | 4/2016 | Knapp | |
| 10,710,631 B2 | 7/2020 | Zhang et al. | |
| 11,535,318 B2 * | 12/2022 | Guntert, Jr. | B62D 11/20 |
| 11,772,445 B2 | 10/2023 | Ponstein | |
| 12,173,456 B2 * | 12/2024 | Wulf | B62D 11/20 |
| 2013/0062854 A1 * | 3/2013 | Gorrell | B60G 9/02 |
| | | | 280/124.169 |
| 2016/0244096 A1 * | 8/2016 | Klein | B62D 11/20 |
| 2018/0155883 A1 * | 6/2018 | Engels | E01C 19/4893 |
| 2021/0231138 A1 * | 7/2021 | Engelmann | B60G 17/019 |
| 2021/0231197 A1 * | 7/2021 | Graves | E01C 19/48 |
| 2022/0032782 A1 * | 2/2022 | Klim | B62D 63/02 |

FOREIGN PATENT DOCUMENTS

DE 102014000236 12/2022

* cited by examiner

*Primary Examiner* — Toan C To (57) ABSTRACT

A leg tube assembly for a work machine includes a first tube coupled with a frame of the work machine and a second tube coupled to the first tube and slidable relative to the first tube between an extended position and a retracted position. The first tube defines a first inner surface. The second tube includes a tube body defining a second inner surface, a second outer surface, a first end, and a second end. The tube body defines at least one recess on the second outer surface. The second tube includes at least one support member disposed within the at least one recess of the tube body between the first tube and the tube body of the second tube. The at least one support member is adapted to engage with the first inner surface of the first tube and includes any one of a bearing and a wear pad.

20 Claims, 8 Drawing Sheets

LEG TUBE ASSEMBLY AND METHOD OF MANUFACTURING LEG TUBE ASSEMBLY

TECHNICAL FIELD

The present disclosure relates to a work machine, a leg tube assembly for the work machine, and a method of manufacturing the leg tube assembly for the work machine.

BACKGROUND

Work machines, such as a reclaimer or a cold planer, may be used for various applications, such as full-depth reclamation or soil stabilization. Such work machines typically include a cutting rotor. The work machines also include vertically adjustable leg tubes that are used to raise and lower the work machine relative to a ground surface. The leg tubes rely on bearings to support the leg tubes while the work machine raises and lowers. Specifically, each leg tube includes two bearings that are positioned at a lower end in a supporting frame structure for the leg tube, to keep leg bores tight. However, with no support at a top end of each leg tube, the leg tube may tip inside the supporting frame structure, which may cause increased wear of the leg tubes and inaccurate track/ground contact position, which is not desirable.

U.S. Pat. No. 11,772,445 describes a construction machine, in particular a road milling machine, comprising a machine frame, a traveling mechanism with front and rear traveling devices with at least one pair of front traveling devices and/or one pair of rear traveling devices, at least one pair of the front or rear traveling devices being connected to the machine frame via lifting columns each having a hydraulically adjustable piston-cylinder unit, a drive device for driving the hydraulically adjustable piston-cylinder unit of the lifting columns separately from one another, and a control device configured to control the lifting adjustment of the lifting columns by means of the hydraulically adjustable piston-cylinder units, and to a method for controlling the lifting position of a piston-cylinder unit of a lifting column of a construction machine, in particular a construction machine according to the invention.

SUMMARY OF THE DISCLOSURE

In an aspect of the present disclosure, a leg tube assembly for a work machine is provided. The leg tube assembly includes a first tube coupled with a frame of the work machine. The first tube defines a first inner surface. The leg tube assembly also includes a second tube coupled to the first tube and slidable relative to the first tube between an extended position and a retracted position. The second tube is received within the first tube. The second tube includes a tube body defining a second inner surface, a second outer surface opposite the second inner surface, a first end that is disposed within the first tube in each of the extended position and the retracted position of the second tube, and a second end that extends out of the first tube when the second tube is in the extended position. The tube body defines at least one recess on the second outer surface thereof. The at least one recess extends axially from the first end of the tube body towards the second end of the tube body and extends at least partially along a circumferential direction. The second tube also includes at least one support member disposed within the at least one recess of the tube body. The at least one support member is disposed between the first tube and the tube body of the second tube. The at least one support member is adapted to engage with the first inner surface of the first tube. The at least one support member includes any one of a bearing and a wear pad.

In another aspect of the present disclosure, a work machine is provided. The work machine includes a frame. The work machine also includes a plurality of leg tube assemblies coupled to the frame. Each of the plurality of leg tube assemblies are adjustable to raise or lower the work machine relative to a ground surface. Each of the plurality of leg tube assemblies includes a first tube coupled with the frame of the work machine. The first tube defines a first inner surface. Each of the plurality of leg tube assemblies also includes a second tube coupled to the first tube and slidable relative to the first tube between an extended position and a retracted position. The second tube is received within the first tube. The second tube includes a tube body defining a second inner surface, a second outer surface opposite the second inner surface, a first end that is disposed within the first tube in each of the extended position and the retracted position of the second tube, and a second end that extends out of the first tube when the second tube is in the extended position. The tube body defines at least one recess on the second outer surface thereof. The at least one recess extends axially from the first end of the tube body towards the second end of the tube body and extends at least partially along a circumferential direction. The second tube also includes at least one support member disposed within the at least one recess of the tube body. The at least one support member is disposed between the first tube and the tube body of the second tube. The at least one support member is adapted to engage with the first inner surface of the first tube. The at least one support member includes any one of a bearing and a wear pad.

In yet another aspect of the present disclosure, a method of manufacturing a leg tube assembly for a work machine is provided. The method includes forming a first tube of the leg tube assembly. The first tube defines a first inner surface. The method also includes forming a tube body of a second tube of the leg tube assembly. The tube body defines a second inner surface, a second outer surface opposite the second inner surface, a first end, and a second end opposite the first end. The method further includes defining at least one recess on the second outer surface of the tube body. The at least one recess extends axially from the first end of the tube body towards the second end of the tube body and extends at least partially along a circumferential direction. The method includes disposing at least one support member of the second tube within the at least one recess of the tube body. The at least one support member includes any one of a bearing and a wear pad. The method further includes coupling the second tube with the first tube based on a receipt of the first tube within the second tube. The at least one support member is disposed between the first tube and the tube body of the second tube. The method includes engaging the at least one support member with the first inner surface of the first tube based on the coupling of the second tube with the first tube.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
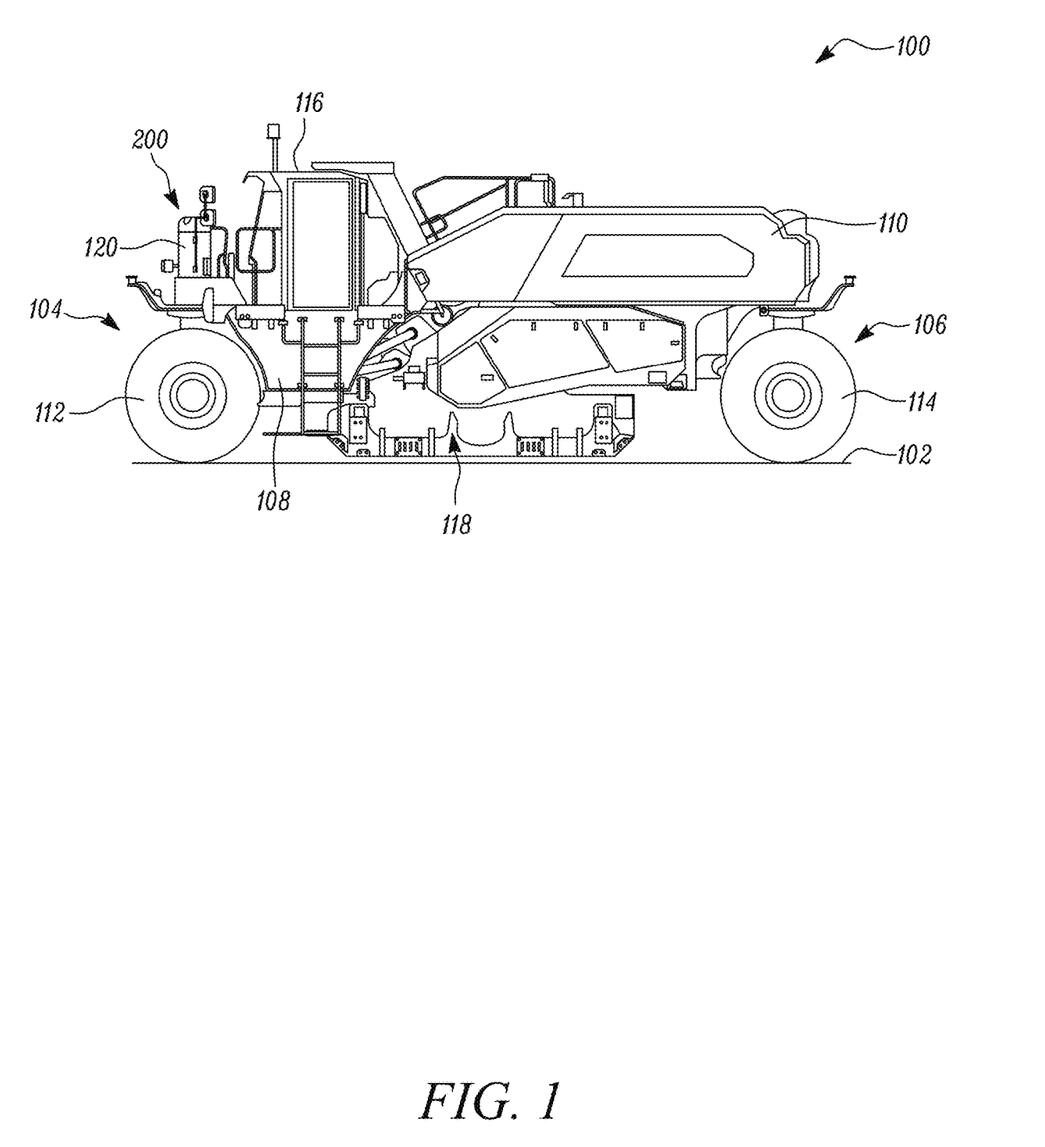
FIG. 1 is a schematic side view of a work machine, according to an example of the present disclosure.

FIG. 1 is a schematic side view of a work machine 100, according to an example of the present disclosure. The work machine 100 is embodied as a reclaimer herein. In other examples, the work machine 100 may include any another machine used for milling, road reclamation, soil stabilization, surface pulverization, and other related applications, such as, a cold planar, a rotary mixer, and the like. The work machine 100 operates on a ground surface 102.

The work machine 100 defines a front end 104 and a rear end 106. The work machine 100 includes a frame 108. A power source (not shown) is positioned proximate to the front end 104 within a compartment (not shown). The compartment is covered by a hood 110 that may be opened to access the power source. The power source may be an engine, a battery system, a fuel cell, or a combination thereof.

A pair of front wheels 112 are disposed proximate to the front end 104 of the work machine 100. Further, a pair of rear wheels 114 are disposed proximate to the rear end 106 of the work machine 100. Alternatively, the work machine 100 may include tracks (not shown) instead of the wheels 112, 114. The work machine 100 has an operator cabin 116. When the work machine 100 is embodied as a manual or semi-autonomous machine, an operator of the work machine 100 may sit in the operator cabin 116 to operate the work machine 100.

Further, the work machine 100 includes a mixing chamber 118 defined between the front and rear wheels 112, 114. The mixing chamber 118 is an enclosed space that is defined under the frame 108 and extends laterally across the work machine 100. Moreover, a rotor (not shown) is disposed within the mixing chamber 118. The rotor is rotatably coupled to the work machine 100 for performing one or more machine operations, such as cutting, mixing, and/or pulverizing material. The rotor is powered by the power source. The rotor includes a shell member, and a number of cutting assemblies disposed on the shell member.

Figure 2:
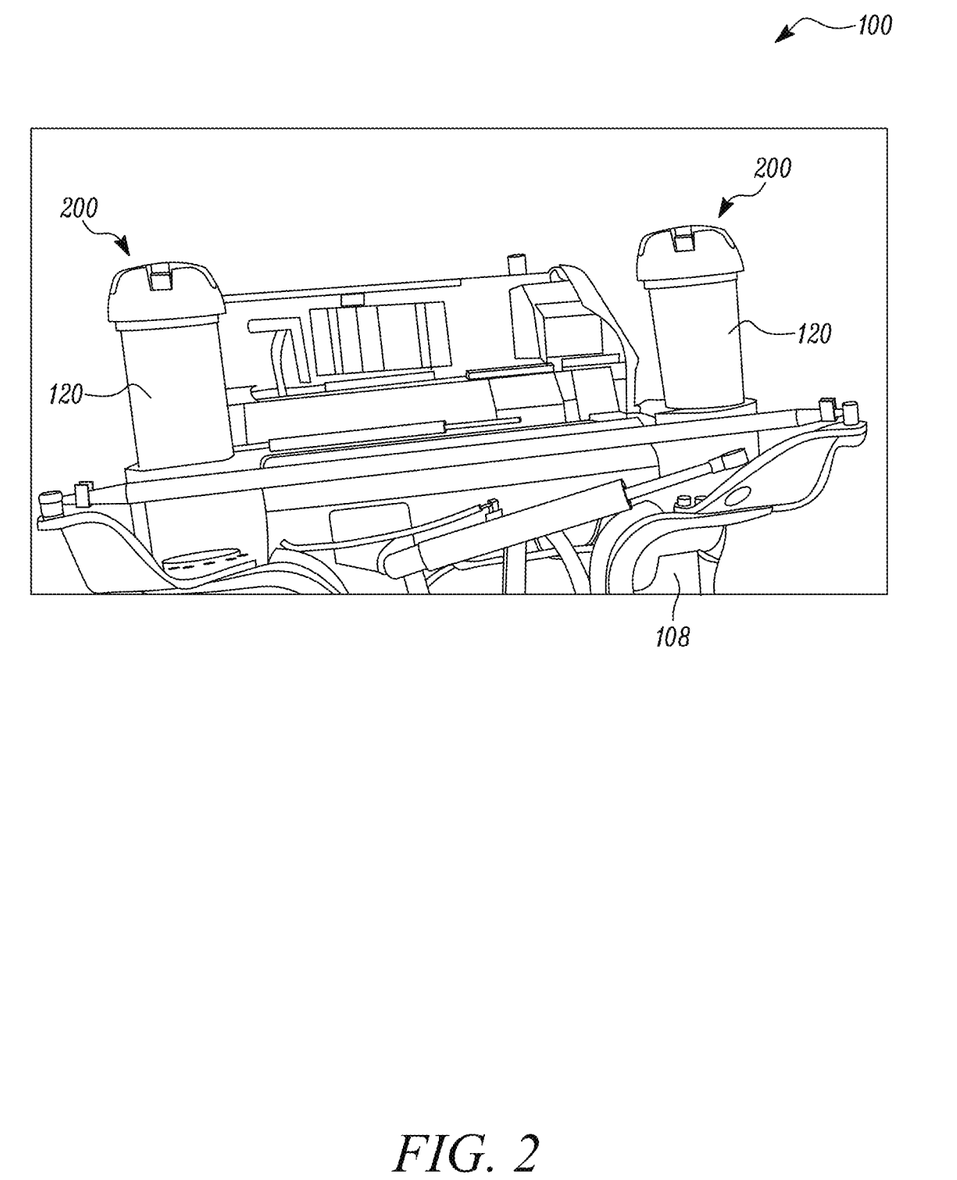
FIG. 2 is a perspective view of a portion of the work machine of FIG. 1 illustrating a pair of leg tube assemblies.

Referring to FIGS. 1 and 2, the frame 108 includes a number of support structures 120. The work machine 100 also includes a number of leg tube assemblies 200 coupled to the frame 108. In some examples, the work machine 100 includes four leg tube assemblies 200. The four leg tube assemblies 200 are similar to each other in terms of design and dimensions. Each of the number of leg tube assemblies 200 are adjustable to raise or lower the work machine 100 relative to the ground surface 102. The leg tube assemblies 200 may also be referred to as lifting columns. In some examples, the wheels 112, 114 can be connected to the frame 108 via the leg tube assemblies 200. Each support structure 120 of the frame 108 receives and supports a corresponding leg tube assembly 200 from the number of leg tube assemblies 200. Each leg tube assembly 200 may include an actuator (not shown), such as a hydraulic actuator, to facilitate raising and lowering of the frame 108 relative to the wheels 112, 114.

Figure 3A:
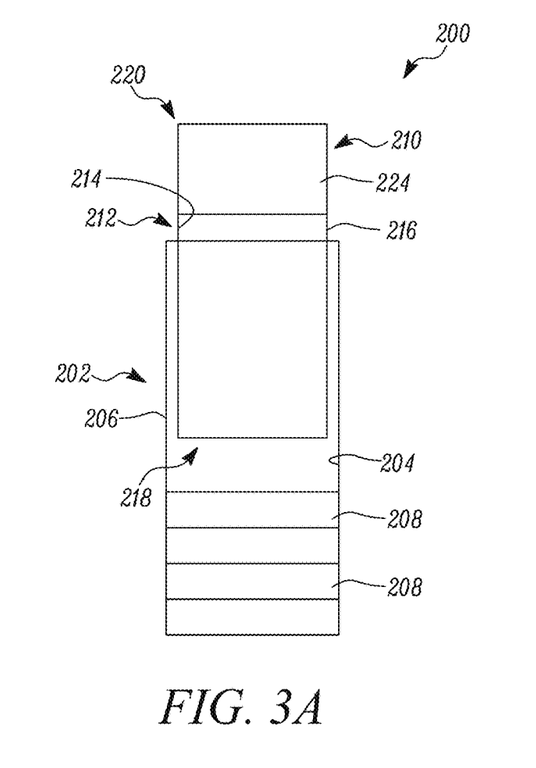
FIG. 3A is a schematic view of a leg tube assembly of FIG. 2, according to an example of the present disclosure.

As shown in FIG. 3A, the leg tube assembly 200 includes a first tube 202 coupled with the frame 108 (see FIG. 1) of the work machine 100. The first tube 202 defines a first inner surface 204. The first tube 202 also defines a first outer surface 206. Further, in some examples, a pair of bearings 208 are disposed on the first outer surface 206 proximal to a lower end of the first tube 202.

The leg tube assembly 200 also includes a second tube 210 coupled to the first tube 202 and slidable relative to the first tube 202 between an extended position and a retracted position. The second tube 210 is received within the first tube 202. The second tube 210 slides based on an operation of the actuator. The second tube 210 includes a tube body 212. The tube body 212 defines a second inner surface 214, a second outer surface 216 opposite the second inner surface 214, a first end 218 that is disposed within the first tube 202 in each of the extended position and the retracted position of the second tube 210, and a second end 220 that extends out of the first tube 202 when the second tube 210 is in the extended position. The second tube 210 is shown in the extended position in FIG. 3B.

Figure 3B:
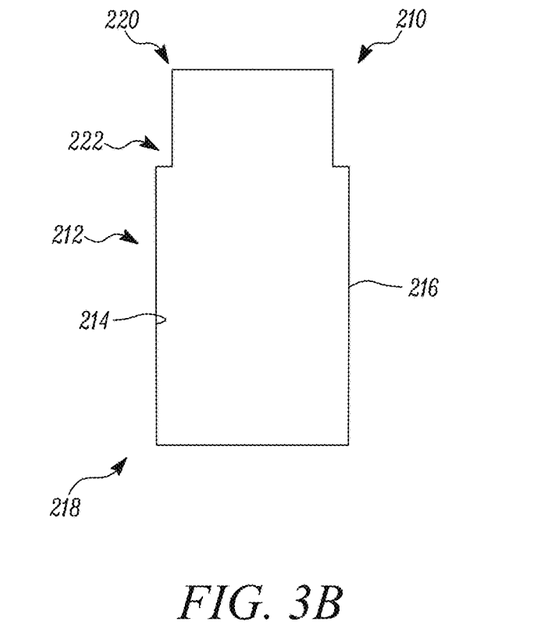
FIG. 3B is a schematic view of a second tube of the leg tube assembly of FIG. 3A.

As shown in FIG. 3B, the tube body 212 defines one or more recesses 222 on the second outer surface 216 thereof. The one or more recesses 222 extend axially from the first end 218 of the tube body 212 towards the second end 220 of the tube body 212 and extend at least partially along a circumferential direction D1. In the illustrated example of FIG. 3B, the one or more recesses 222 includes an annular recess 222 that extends circumferentially along the second outer surface 216 of the tube body 212. The one or more recesses 222 may be hereinafter interchangeably referred to as "the annular recess 222".

Figure 4:
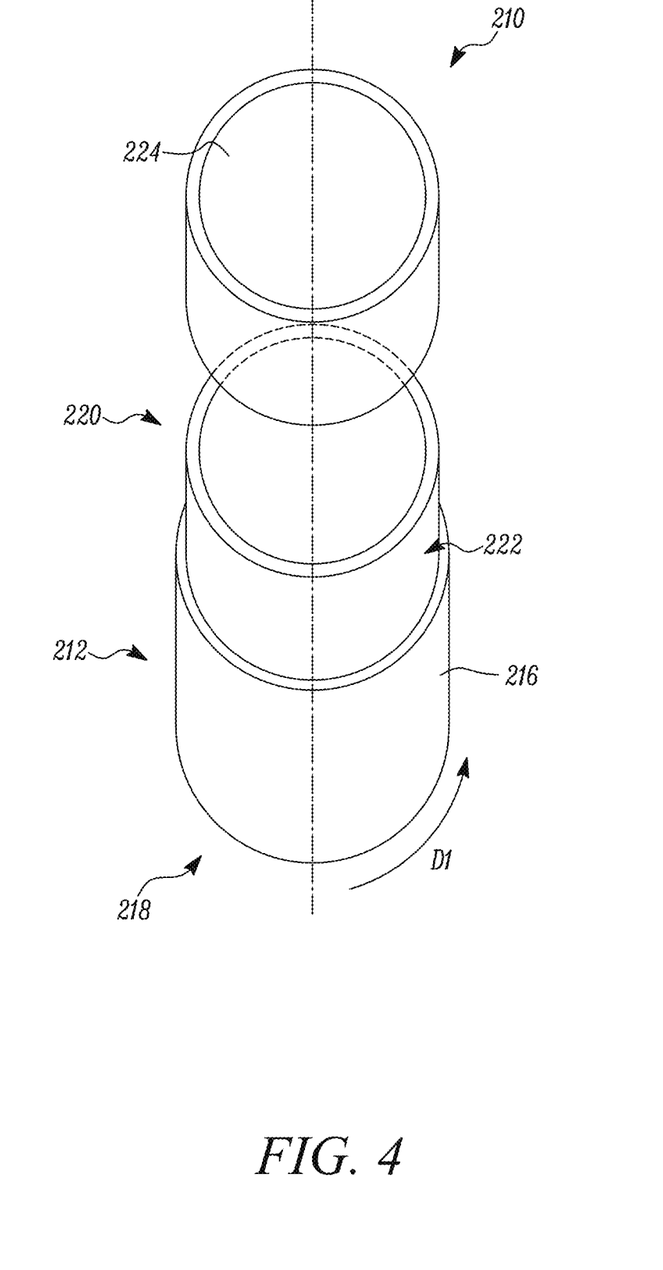
FIG. 4 is an exploded view of a support member and a tube body of the second tube of FIG. 3B.

As shown in FIG. 4, the second tube 210 also includes one or more support members 224 disposed within the one or more recesses 222 of the tube body 212. The one or more support members 224 are disposed between the first tube 202 and the tube body 212 of the second tube 210. The one or more support members 224 engage with the first inner surface 204 of the first tube 202. The one or more support members 224 include a bearing 224 or a wear pad. In the illustrated example of FIG. 4, the one or more support members 224 include the single, annular bearing 224 that is received within the annular recess 222 of the tube body 212. The one or more support members 224 may be hereinafter interchangeably referred to as "the annular bearing 224" or "the bearing 224". In operation, the annular bearing 224 moves with the second tube 210. The annular bearing 224 is made of a metal or a composite. In an example, the annular bearing 224 may be made of bronze.

Figure 5:
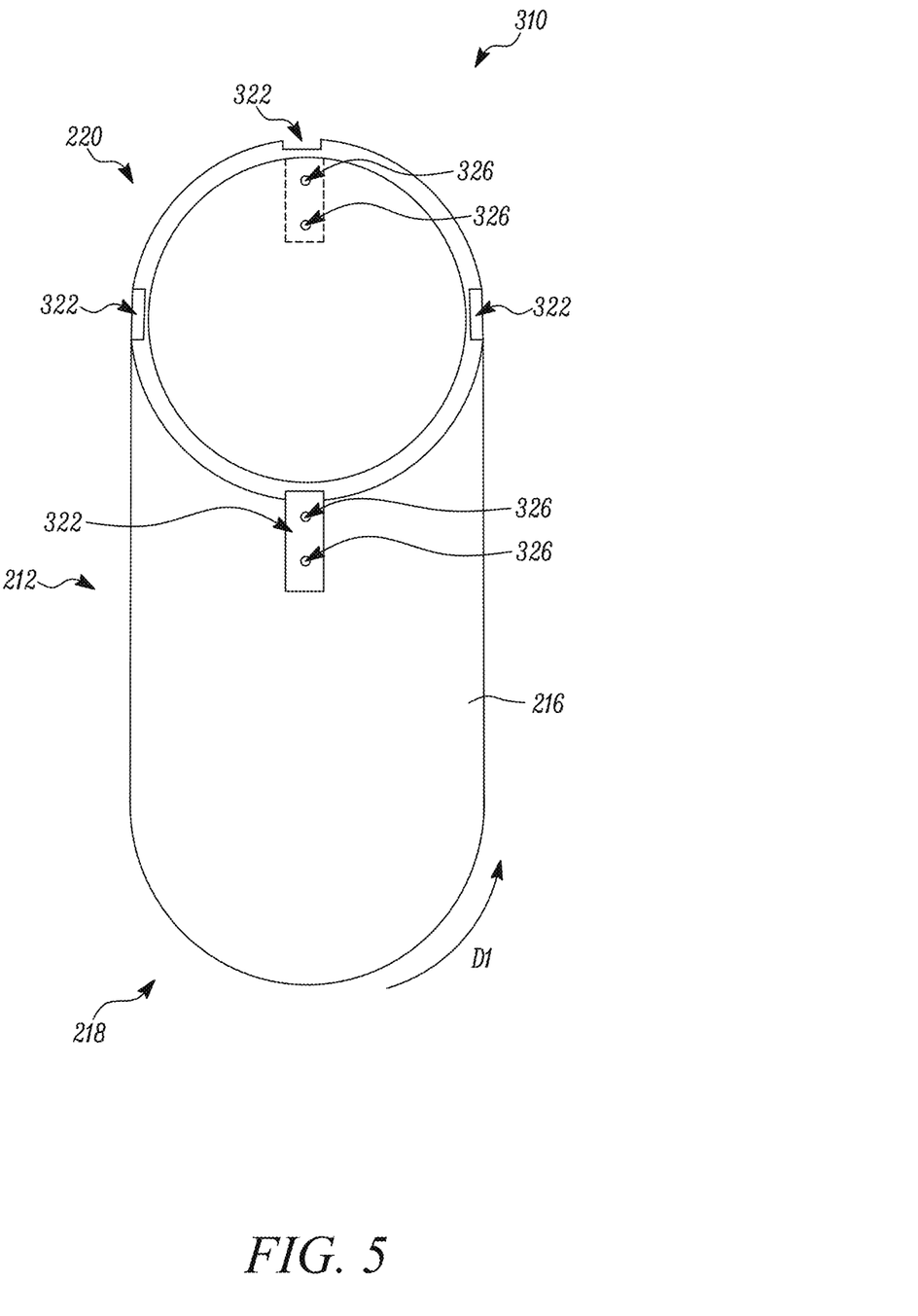
FIG. 5 is a schematic view of a second tube of the leg tube assembly of FIG. 2, according to another example of the present disclosure.

FIGS. 5 to 7C illustrate another embodiment of the present disclosure. Referring to FIG. 5, the leg tube assembly 200 includes a second tube 310. The second tube 310 is substantially similar to the second tube 210 explained in relation to FIGS. 3 and 4, with common components referred to by the same numerals. The tube body 212 of the second tube 310 defines one or more recesses 322 on the second outer surface 216. In the illustrated example of FIG. 5, the one or more recesses 322 includes a number of recesses 322 that are circumferentially spaced apart from each other along the second outer surface 216 of the tube body 212. Specifically, the number of recesses 322 includes four recesses 322. Further, the tube body 212 defines a number of pairs of first through-holes 326. Specifically, the tube body 212 defines four pairs of first through-holes 326. Each first through-hole 326 extends from the second inner surface 214. Each pair of first through-hole 326 is in communication with a corresponding recess 322.

Figure 6:
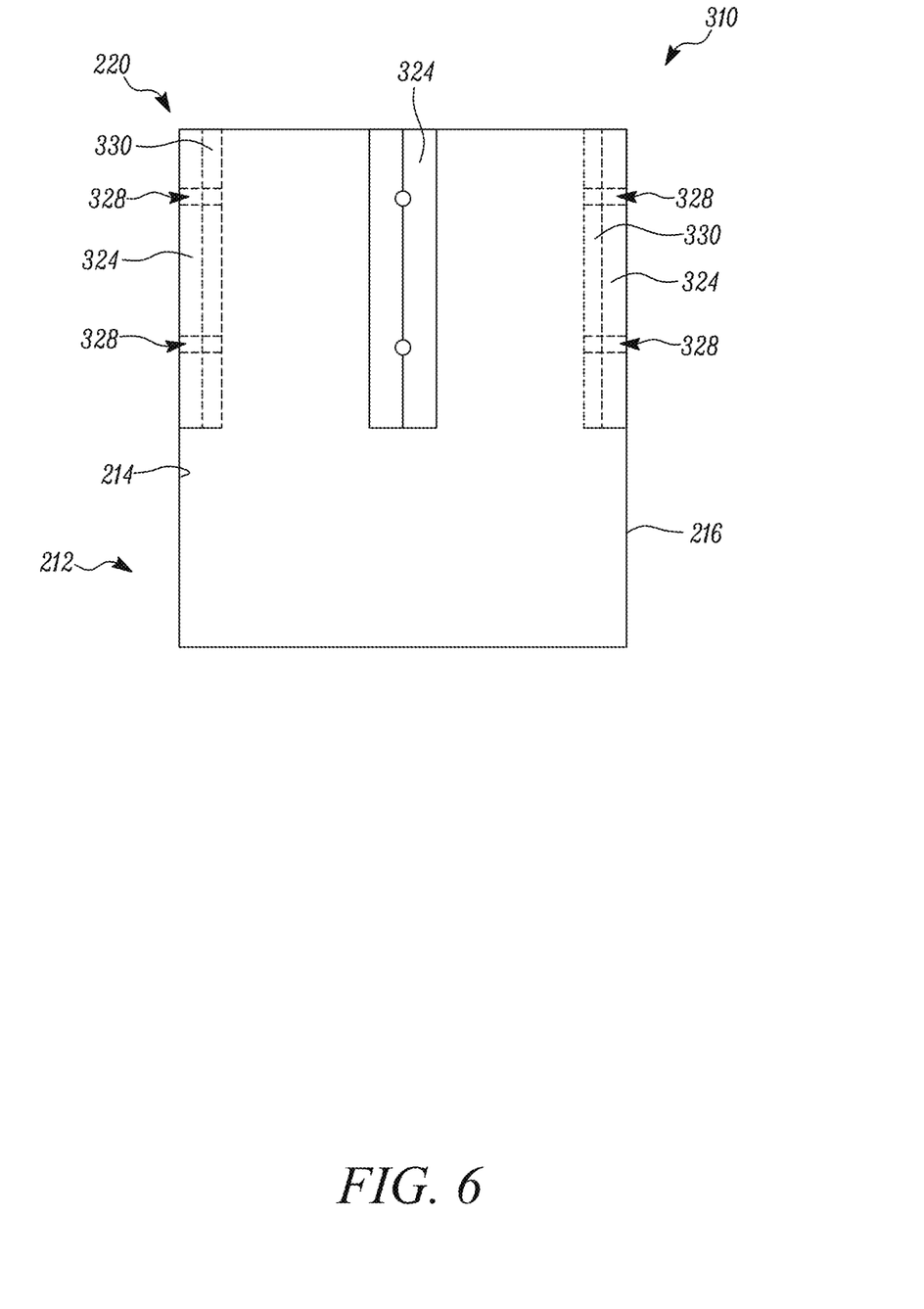
FIG. 6 is a schematic view of a support member coupled with the second tube of FIG. 5.

Referring now to FIG. 6, the second tube 310 includes one or more support members 324 disposed within the one or more recesses 322 of the tube body 212. In the illustrated example of FIG. 5, the one or more support members 324 include a number of wear pads 324. The one or more support members 324 may be hereinafter interchangeably referred to as "the wear pad 324". Each recess 322 from the number of recesses 322 receives a corresponding wear pad 324 from the number of wear pads 324. Specifically, the number of wear pads 324 includes four wear pads 324. Each wear pad 324 is rectangular in shape. However, each wear pad 324 may have any other shape. Further, each wear pad 324 defines a pair of second through-holes 328.

Figure 7A:
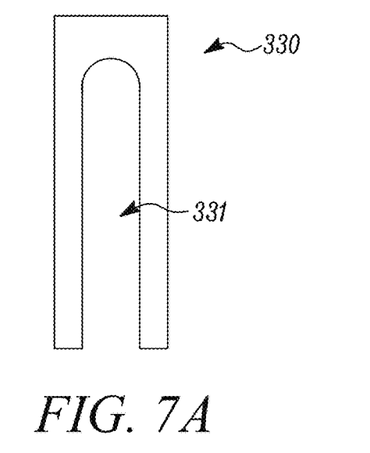
FIG. 7A is a schematic view of a shim for the second tube of FIGS. 5 and 6.
Figure 7B:
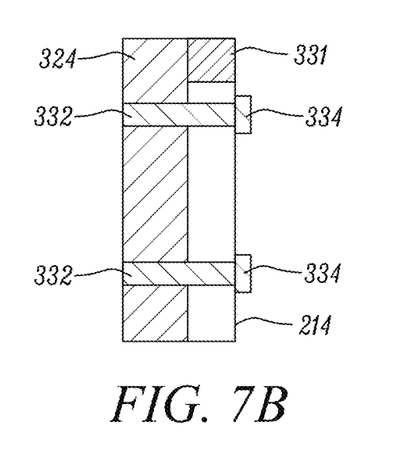
FIG. 7B is a sectional view of the shim and the support member coupled with the second tube of FIGS. 6 and 7A.

Referring now to FIGS. 7A and 7B, the second tube 310 further includes a number of shims 330. Each shim 330 from the number of shims 330 is disposed between a corresponding wear pad 324 and the tube body 212. The number of shims 330 includes four shims 330. The shim 330 has a U-shaped slot 331. The shim 330 has a rectangular shape. Alternatively, the shim 330 may have any other shape. Dimensions and shape of the wear pad 324 are same as dimensions and shape of the shim 330. The number of wear pads 324 and the number of shims 330 may be made of a wear resistant material. In some examples, the number of wear pads 324 and the number of shims 330 are made of a polymer, a metal, or a composite. In an example, the number of wear pads 324 and the number of shims 330 may be made of bronze.

Figure 7C:
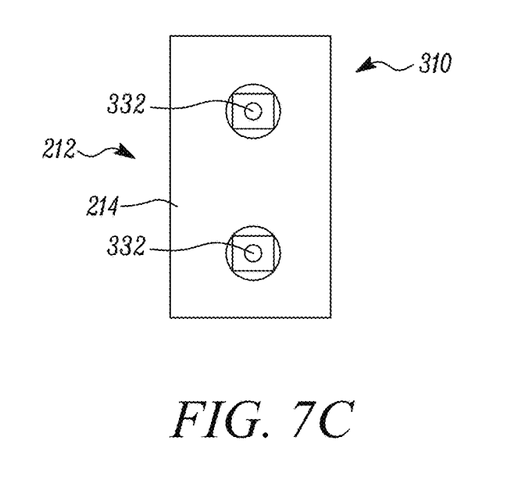
FIG. 7C is a schematic view illustrating an inner surface of a tube body of the second tube of FIGS. 5 and 6.

Referring now to FIGS. 7B and 7C, the second tube 310 further includes a number of pairs of fasteners 332. Each wear pad 324 is coupled with the tube body 212 and a corresponding shim 330 via a corresponding pair of fasteners 332 from the number of pairs of fasteners 332. Each second through-hole 328 (see FIG. 6) aligns with a corresponding first through-hole 326 (see FIG. 5) in the tube body 212 to receive a corresponding fastener 332. The number of fasteners 332 includes four pairs of fasteners 332. Each fastener 332 may include a bolt, a screw, a pin, and the like. In some examples, each second through-hole 328 in the wear pad 324 may include a threaded hole and each fastener 332 may include a number of external threads, to engage and couple with the corresponding second through-hole 328 of the wear pad 324. Each fastener 332 is coupled with the tube body 212 and a corresponding wear pad 324, such that, a head 334 of the fastener 332 engages with the second inner surface 214 of the tube body 212.

It may be noted that individual features shown or described for one embodiment may be combined with individual features shown or described for another embodiment. The above-described implementation does not in any way limit the scope of the present disclosure. Therefore, it is to be understood although some features are shown or described to illustrate the use of the present disclosure in the context of functional segments, such features may be omitted from the scope of the present disclosure as defined in the appended claims.

INDUSTRIAL APPLICABILITY

The present disclosure is related to the leg tube assemblies 200 for the work machine 100. Each leg tube assembly 200 includes the support member 224, 324, i.e., the annular bearing 224, or the number of wear pads 324. In operation, the support member 224, 324 moves with the second tube 210. Further, the annular bearing 224 may support a top end, i.e., the first end 218 of the second tube 310 when the second tube 310 is fully retracted, and the work machine 100 is at its lowest position relative to the ground surface 102. Additionally, the annular bearing 224 may provide support when side loads are applied to the frame 108.

Further, the number of wear pads 324 may support the top end of the second tube 310 and reduce wear on the bearings 208. Further, the second tube 310 includes the shims 330 which may allow tightening of the top end of the second tube 310, without replacing the wear pads 324. Additionally, the annular bearing 224 and the number of wear pads 324 may assist in retaining the second tube 310 at its desired position, thereby keeping the leg tube assembly 200 tighter, which may increase machine stability and translate into a better cut. Moreover, the support member 224, 324 may allow controlled movement of the second tube 310 relative to the first tube 202, which may in turn prevent wear and allow accurate positioning of the leg tube assembly 200.

Figure 8:
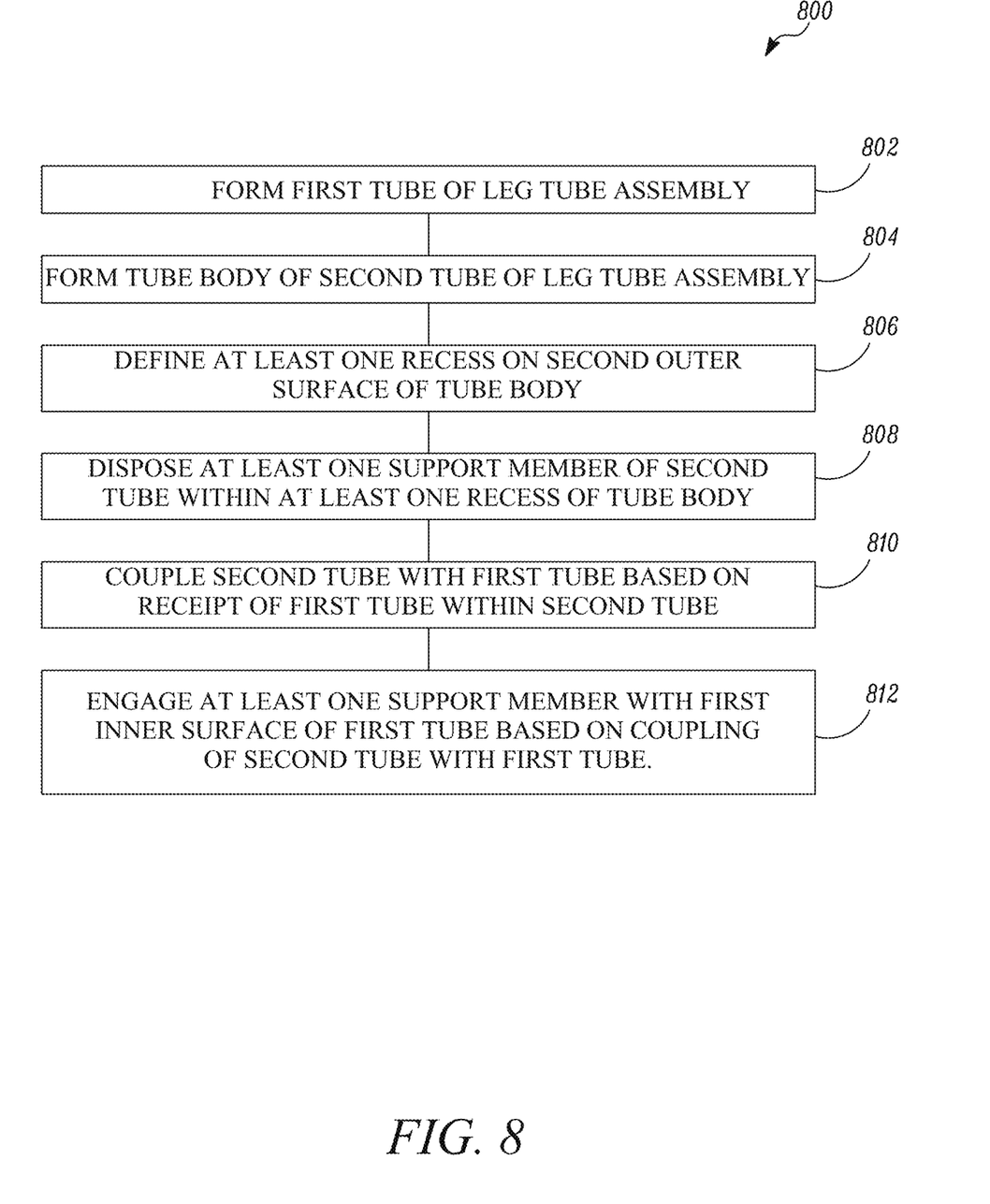
FIG. 8 is a flowchart for a method of manufacturing the leg tube assembly for the work machine, according to an example of the present disclosure.

FIG. 8 is the flowchart for a method 800 of manufacturing the leg tube assembly 200 for the work machine 100.

Referring to FIGS. 1 to 8, at step 802, the first tube 202 of the leg tube assembly 200 is formed. The first tube 202 defines the first inner surface 204.

At step 804, the tube body 212 of the second tube 210, 310 of the leg tube assembly 200 is formed. The tube body 212 defines the second inner surface 214, the second outer surface 216 opposite the second inner surface 214, the first end 218, and the second end 220 opposite the first end 218.

At step 806, the one or more recesses 222, 322 are defined on the second outer surface 216 of the tube body 212. The one or more recesses 222, 322 extend axially from the first end 218 of the tube body 212 towards the second end 220 of the tube body 212 and extends at least partially along the circumferential direction D1.

At step 808, the one or more support members 224, 324 of the second tube 210, 310 are disposed within the one or more recesses 222, 322 of the tube body 212. The one or more support members 224, 324 include any one of the bearing 224 and the wear pad 324.

At step 810, the second tube 210, 310 is coupled with the first tube 202 based on the receipt of the first tube 202 within the second tube 210, 310. The one or more support members 224, 324 is disposed between the first tube 202 and the tube body 212 of the second tube 210, 310.

At step 812, the one or more support members 224, 324 are engaged with the first inner surface 204 of the first tube 202 based on the coupling of the second tube 210, 310 with the first tube 202.

In some examples, the one or more recesses 222 includes the annular recess 222 that extends circumferentially along the second outer surface 216 of the tube body 212. The one or more support members 224 includes the single, annular bearing 224 that is received within the annular recess 222 of the tube body 212. The step 808 further includes the step at which the annular bearing 224 is received within the annular recess 222 of the tube body 212.

In some examples, the one or more recesses 322 include the number of recesses 322 that are circumferentially spaced apart from each other along the second outer surface 216 of the tube body 212. The one or more support members 324 includes the number of wear pads 324. The step 808 further includes the step at which each recess 322 from the number of recesses 322 receives the corresponding wear pad 324 from the number of wear pads 24.

In some examples, the second tube 310 further includes the number of shims 330. The second tube 310 further includes the number of pairs of fasteners 332. The step 808 further includes the step 808 at which each shim 330 from the number of shims 330 is disposed within the corresponding recess 322 from the number of recesses 322, such that each shim 330 is disposed between the corresponding wear pad 324 and the tube body 212. The step 808 further includes the step at which each wear pad 324 from the number of wear pads 324 is coupled with the tube body 212 and the corresponding shim via the corresponding pair of fasteners 332 from the number of pairs of fasteners 332.

It should be noted that one or more steps 802, 804, 806, 808, 810, 812 of the method 800 may be performed in an order that is different from that illustrated in FIG. 8. Moreover, multiple steps 802, 804, 806, 808, 810, 812 may be performed together.

While aspects of the present disclosure have been particularly shown and described with reference to the embodiments above, it will be understood by those skilled in the art that various additional embodiments may be contemplated by the modification of the disclosed purge system, battery system and method steps without departing from the spirit and scope of the disclosure. Such embodiments should be understood to fall within the scope of the present disclosure as determined based upon the claims and any equivalents thereof.

What is claimed is:

1. A leg tube assembly for a work machine, the leg tube assembly comprising:
    a first tube coupled with a frame of the work machine, the first tube defining a first inner surface; and
    a second tube coupled to the first tube and slidable relative to the first tube between an extended position and a retracted position, the second tube being received within the first tube, wherein the second tube includes:
        a tube body defining a second inner surface, a second outer surface opposite the second inner surface, a first end that is disposed within the first tube in each of the extended position and the retracted position of the second tube, and a second end that extends out of the first tube when the second tube is in the extended position, wherein the tube body defines at least one recess on the second outer surface thereof, and wherein the at least one recess extends axially from the first end of the tube body towards the second end of the tube body and extends at least partially along a circumferential direction; and
        at least one support member disposed within the at least one recess of the tube body, wherein the at least one support member is disposed between the first tube and the tube body of the second tube, wherein the at least one support member is adapted to engage with the first inner surface of the first tube, and wherein the at least one support member includes any one of a bearing and a wear pad.

2. The leg tube assembly of claim 1, wherein the at least one recess includes an annular recess that extends circumferentially along the second outer surface of the tube body.

3. The leg tube assembly of claim 2, wherein the at least one support member includes a single, annular bearing that is received within the annular recess of the tube body.

4. The leg tube assembly of claim 3, wherein the annular bearing is made of a metal or a composite.

5. The leg tube assembly of claim 1, wherein the at least one recess includes a plurality of recesses that are circumferentially spaced apart from each other along the second outer surface of the tube body.

6. The leg tube assembly of claim 5, wherein the at least one support member includes a plurality of wear pads, and wherein each recess from the plurality of recesses receives a corresponding wear pad from the plurality of wear pads.

7. The leg tube assembly of claim 6, wherein the plurality of recesses includes four recesses, and wherein the plurality of wear pads includes four wear pads.

8. The leg tube assembly of claim 6, wherein the second tube further includes:
    a plurality of shims, wherein each shim from the plurality of shims is disposed between a corresponding wear pad and the tube body; and
    a plurality of pairs of fasteners, wherein each wear pad is coupled with the tube body and a corresponding shim via a corresponding pair of fasteners from the plurality of pairs of fasteners.

9. The leg tube assembly of claim 8, wherein the plurality of wear pads and the plurality of shims are made of a polymer, a metal, or a composite.

10. A work machine comprising:
    a frame; and
    a plurality of leg tube assemblies coupled to the frame, each of the plurality of leg tube assemblies are adjustable to raise or lower the work machine relative to a ground surface, wherein each of the plurality of leg tube assemblies includes:
        a first tube coupled with the frame of the work machine, the first tube defining a first inner surface; and
        a second tube coupled to the first tube and slidable relative to the first tube between an extended position and a retracted position, the second tube being received within the first tube, wherein the second tube includes:
            a tube body defining a second inner surface, a second outer surface opposite the second inner surface, a first end that is disposed within the first tube in each of the extended position and the retracted position of the second tube, and a second end that extends out of the first tube when the second tube is in the extended position, wherein the tube body defines at least one recess on the second outer surface thereof, and wherein the at least one recess extends axially from the first end of the tube body towards the second end of the tube body and extends at least partially along a circumferential direction; and
            at least one support member disposed within the at least one recess of the tube body, wherein the at least one support member is disposed between the first tube and the tube body of the second tube, wherein the at least one support member is adapted to engage with the first inner surface of the first tube, and wherein the at least one support member includes any one of a bearing and a wear pad.

11. The work machine of claim 10, wherein the at least one recess includes an annular recess that extends circumferentially along the second outer surface of the tube body.

12. The work machine of claim 11, wherein the at least one support member includes a single, annular bearing that is received within the annular recess of the tube body.

13. The work machine of claim 10, wherein the at least one recess includes a plurality of recesses that are circumferentially spaced apart from each other along the second outer surface of the tube body.

14. The work machine of claim 13, wherein the at least one support member includes a plurality of wear pads, and wherein each recess from the plurality of recesses receives a corresponding wear pad from the plurality of wear pads.

15. The work machine of claim 14, wherein the plurality of recesses includes four recesses, and wherein the plurality of wear pads includes four wear pads.

16. The work machine of claim 14, wherein the second tube further includes:
 a plurality of shims, wherein each shim from the plurality of shims is disposed between a corresponding wear pad and the tube body; and
 a plurality of pairs of fasteners, wherein each wear pad is coupled with the tube body and a corresponding shim via a corresponding pair of fasteners from the plurality of pairs of fasteners.

17. A method of manufacturing a leg tube assembly for a work machine, the method comprising:
 forming a first tube of the leg tube assembly, the first tube defining a first inner surface;
 forming a tube body of a second tube of the leg tube assembly, the tube body defining a second inner surface, a second outer surface opposite the second inner surface, a first end, and a second end opposite the first end;
 defining at least one recess on the second outer surface of the tube body, wherein the at least one recess extends axially from the first end of the tube body towards the second end of the tube body and extends at least partially along a circumferential direction;
 disposing at least one support member of the second tube within the at least one recess of the tube body, wherein the at least one support member includes any one of a bearing and a wear pad;
 coupling the second tube with the first tube based on a receipt of the first tube within the second tube, wherein the at least one support member is disposed between the first tube and the tube body of the second tube; and
 engaging the at least one support member with the first inner surface of the first tube based on the coupling of the second tube with the first tube.

18. The method of claim 17, wherein the at least one recess includes an annular recess that extends circumferentially along the second outer surface of the tube body, wherein the at least one support member includes a single, annular bearing that is received within the annular recess of the tube body, and wherein the step of disposing the at least one support member within the at least one recess of the tube body further includes receiving the annular bearing within the annular recess of the tube body.

19. The method of claim 17, wherein the at least one recess includes a plurality of recesses that are circumferentially spaced apart from each other along the second outer surface of the tube body, wherein the at least one support member includes a plurality of wear pads, and wherein the step of disposing the at least one support member within the at least one recess of the tube body further includes receiving, within each recess from the plurality of recesses, a corresponding wear pad from the plurality of wear pads.

20. The method of claim 19, wherein the second tube further includes a plurality of shims, wherein the second tube further includes a plurality of pairs of fasteners, and wherein the step of disposing the at least one support member within the at least one recess of the tube body further includes:
 disposing each shim from the plurality of shims within a corresponding recess from the plurality of recesses, such that each shim is disposed between a corresponding wear pad and the tube body; and
 coupling each wear pad from the plurality of wear pads with the tube body and a corresponding shim via a corresponding pair of fasteners from the plurality of pairs of fasteners.

* * * * *